US008944705B1

(12) United States Patent
Matori

(10) Patent No.: US 8,944,705 B1
(45) Date of Patent: Feb. 3, 2015

(54) CAMERA UNIT

(71) Applicant: Honda Motor Co., Ltd., Minato-Ku, Tokyo (JP)

(72) Inventor: Tadahiro Matori, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/337,289

(22) Filed: Jul. 22, 2014

(30) Foreign Application Priority Data

Jul. 23, 2013 (JP) ................. 2013-152423

(51) Int. Cl.
G03B 17/00 (2006.01)
G03B 17/56 (2006.01)
(52) U.S. Cl.
CPC .................. *G03B 17/561* (2013.01)
USPC .......................................... 396/419
(58) Field of Classification Search
USPC .......................................... 396/419
See application file for complete search history.

(56) References Cited

U.S. PATENT DOCUMENTS

| 3,291,179 | A | * | 12/1966 | Lang | 206/316.2 |
|---|---|---|---|---|---|
| 4,536,925 | A | * | 8/1985 | Boothe et al. | 24/511 |
| 2011/0129209 | A1 | * | 6/2011 | Kortan et al. | 396/419 |
| 2012/0099850 | A1 | | 4/2012 | Onishi et al. | |
| 2012/0207461 | A1 | * | 8/2012 | Okuda | 396/419 |

FOREIGN PATENT DOCUMENTS

JP 2013-186278 A 9/2013

* cited by examiner

*Primary Examiner* — Clayton E Laballe
*Assistant Examiner* — Dennis Hancock
(74) *Attorney, Agent, or Firm* — Carrier Blackman & Associates, P.C.; Joseph P. Carrier; William D. Blackman

(57) ABSTRACT

A camera unit increases the degree of freedom with which the camera unit can be designed. The camera unit includes a camera body having a hook held in hooked engagement with a bracket. The bracket includes a first support engaged by the hook and which supports the camera body in an angularly movable fashion, and a second support supporting the camera body that is secured to the second support.

6 Claims, 10 Drawing Sheets

CAMERA UNIT

CROSS-REFERENCE TO RELATED APPLICATION

This application is based upon and claims the benefit of priority from Japanese Patent Application No. 2013-152423 filed on Jul. 23, 2013, the contents of which are incorporated herein by reference.

BACKGROUND OF THE INVENTION

1. Field of the Invention

The present invention relates to a camera unit having a camera body and a bracket for fixing the camera body, which is detachably supported on the bracket, to an object such as a vehicular front windshield, for example, on which the camera unit is installed.

2. Description of the Related Art

U.S. Patent Application Publication No. 2012/0099850 (hereinafter referred to as "US 2012/0099850 A1") discloses a mounting structure, which enables a vehicle camera to be detachably mounted easily in place, and which makes it possible to position the mounted vehicle camera suitably (see paragraph [0005]). To achieve this object, the mounting structure disclosed in US 2012/0099850 A1 has a base 12 fixed to a vehicle body, a camera 11, a slide mechanism 47 for sliding the camera 11 into and out of engagement with the base 12, teeth 28, 29 disposed in front left and right positions and rear left and right positions on either one of the base 12 or the camera 11 with respect to a direction in which the camera 11 is slid into engagement with the base 12, and abutting members 39, 41, which are disposed on the other one of the base 12 and the camera 11 for abutting laterally against the front left and right and rear left and right teeth 28, 29 and determining the position of the camera 11 relative to the base 12 (Abstract).

As shown in FIGS. 1B and 1C of US 2012/0099850 A1, for installing the camera 11 on the base 12, which is fixed to a front windshield, the camera 11 is slid in a forward direction of the vehicle in order to insert a pair of left and right slide guides 26, 26 of the slide mechanism 47 into a pair of left and right slide recesses 42, 42 (see paragraph [0048]).

SUMMARY OF THE INVENTION

As described above, the mounting structure disclosed in US 2012/0099850 A1 is a structure that requires the camera 11 to slide until the camera 11 is fixed in position. Therefore, according to US 2012/0099850 A1, it is necessary to provide a space in which the camera 11 can slide in the vicinity of the front windshield. Such a space tends to restrict the degree of freedom with which the upper portion of the front windshield can be designed. A similar situation occurs if the camera 11 is fixed in other regions apart from the vicinity of the front windshield.

The present invention has been made in view of the aforementioned problems. An object of the present invention is to provide a camera unit, which increases the degree of freedom with which the camera unit can be designed.

According to the present invention, there is provided a camera unit comprising a camera body and a bracket on which the camera body is supported detachably, the bracket securing the camera body to an object on which the camera unit is installed, wherein the camera body includes a hook held in hooked engagement with the bracket, and the bracket includes a first support engaged by the hook and which supports the camera body in an angularly movable fashion, and a second support supporting the camera body that is secured to the second support.

According to the present invention, after the camera body has been turned and positioned with the hook of the camera body being held in hooked engagement with the first support of the bracket, the camera body is secured to the bracket by the second support of the bracket. Therefore, the camera body can be secured in position without requiring sliding movement of the camera body. Hence, the camera unit can be designed with an increased degree of freedom, or can be constructed so as to save space.

In addition, the camera unit can be designed in such a manner that the distance between facing surfaces of the bracket and the camera body is reduced when the camera body is turned and positioned while the hook is held in hooked engagement with the first support flange. Therefore, the camera unit can be constructed so as to save space.

The first support may be disposed on one of the left and right ends of the camera body, and the second support may be disposed on another of the left and right ends of the camera body. Therefore, the structural details of the camera body are simpler in the longitudinal direction thereof and further, the image capturing range of the camera is less subject to limitations than if the first support were disposed on one of the front and rear ends of the camera body, and the second support were disposed on another of the front and rear ends of the camera body.

The second support may include a leaf spring having a principal surface that faces toward the camera body, and one end of the leaf spring may be fixed to a bracket body of the bracket, and another end of the leaf spring may be switchable between a pressing position in which the other end normally presses the camera body, and a spaced position in which the other end is spaced from the camera body for enabling removal of the camera body. Consequently, after the camera body has been turned and positioned with the hook of the camera body 18 being held in hooked engagement with the first support flange of the bracket, the camera body can easily be secured to the bracket by the leaf spring.

The bracket may have a stop for preventing the leaf spring in the spaced position from becoming spaced from the camera body, thereby preventing the leaf spring from becoming plastically deformed. Thus, it is possible to prevent the leaf spring from becoming plastically deformed.

The leaf spring of the bracket may have an engaging ledge that projects toward the camera body, and the camera body may have an engaging cavity for receiving the engaging ledge, which engages in the engaging cavity when the leaf spring is in the pressing position. Consequently, when the engaging ledge of the leaf spring engages with the engaging cavity of the camera body, the camera body can be secured more reliably to the bracket.

The camera body has grooves defined therein at positions aligned with side edges of the leaf spring, the grooves being arranged more closely to a proximal end of the leaf spring than the engaging cavity. During movement of the leaf spring from the pressing position to the spaced position, the grooves are effective to prevent a portion of the camera body from being scraped due to contact with the leaf spring.

The bracket may further include a base having a mounting surface held in contact with the object, and a first side wall and a second side wall, which extend from the base and to left and right side surfaces of the camera body. In this case, the first support may be provided as the first side wall, and the second support may be provided as the second side wall. Further, the leaf spring of the second support may be disposed on the second side wall, and a plurality of positioning convexities for positioning the first side wall may be disposed on a side surface of the camera body that faces toward the first side wall.

The camera body, which is biased by the leaf spring disposed on the second side wall, is positioned by the positioning convexities on the first side wall. Therefore, the optical axis of the camera body can be positioned reliably. Further, since the camera body is positioned as a result of being pressed by the leaf spring, the camera body is subjected to reduced vibration while a vehicle incorporating the camera unit is being driven, and hence noise due to such vibration is reduced.

The first side wall of the bracket may have a hole defined therein for receiving the hook of the camera body that is inserted into the hole. An inner boss that projects toward a proximal end of the hook may be disposed on a tip end portion of the hook. Consequently, the inner boss positions the camera body when the hook of the camera body is inserted into the hole of the bracket. Thereafter, the operator can turn the camera body while the positional relationship between the camera body and the bracket is limited by the inner boss. Accordingly, the camera body can be assembled with fewer assembly irregularities.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A. Embodiment

1. Description of Overall Structure

[1-1. State of Use]

Figure 1:
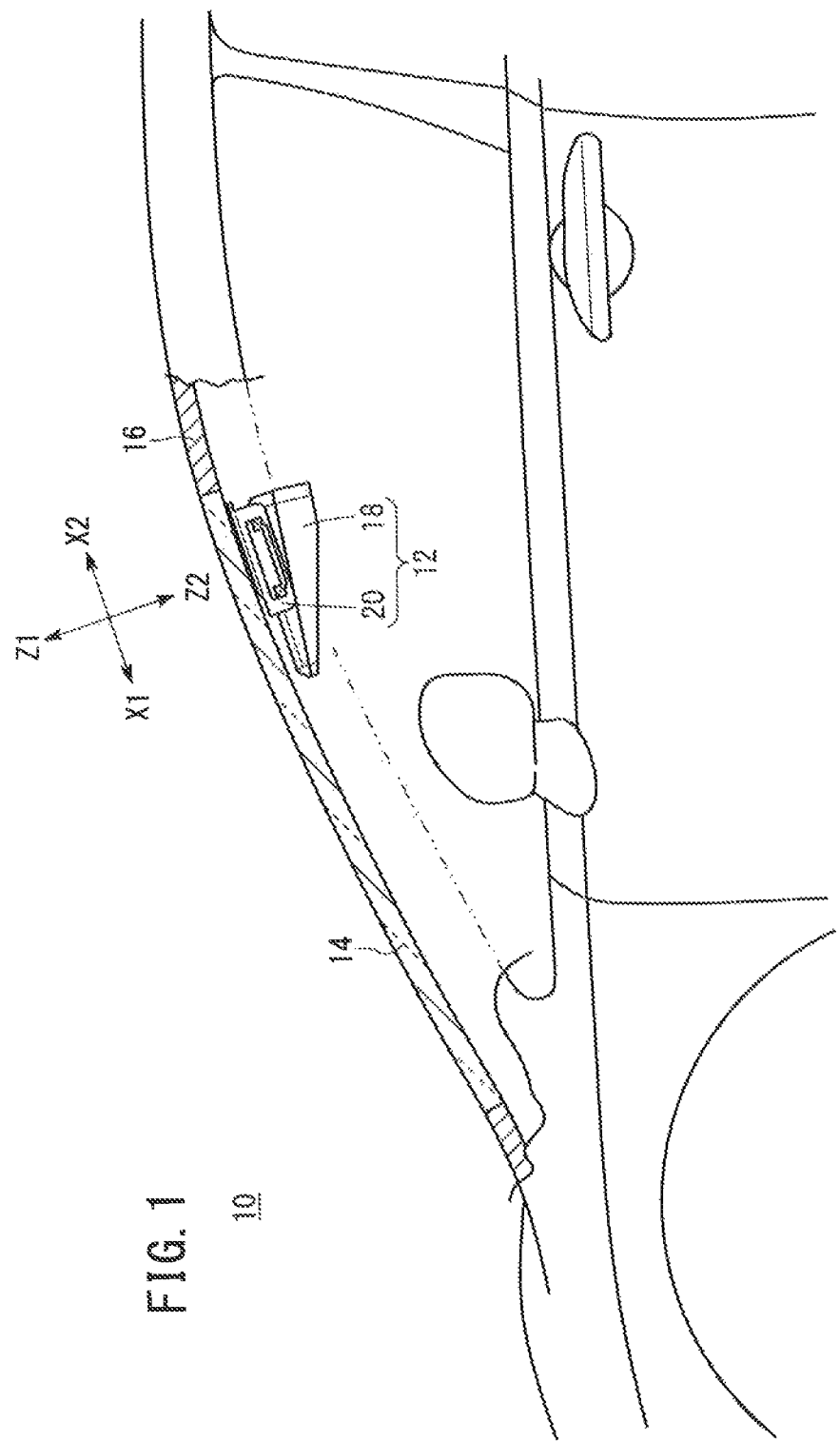
FIG. 1 is a schematic side elevational view showing a manner in which a camera unit according to an embodiment of the present invention is mounted in position.

FIG. 1 is a schematic side elevational view showing a manner in which a camera unit 12 according to an embodiment of the present invention is mounted in position. As shown in FIG. 1, the camera unit 12 is mounted on a front windshield 14 of a vehicle 10. Alternatively, the camera unit 12 may be mounted on a roof 16 of the vehicle 10. The camera unit 12 is fixed in a position laterally of a rearview mirror, not shown.

According to the present embodiment, the camera unit 12 is used to detect a lane or to measure a distance for preventing the vehicle 10 from straying from the lane. However, as will be described in detail later, the camera unit 12 is not limited to such uses.

[1-2. Overall Structure]

Figure 2:
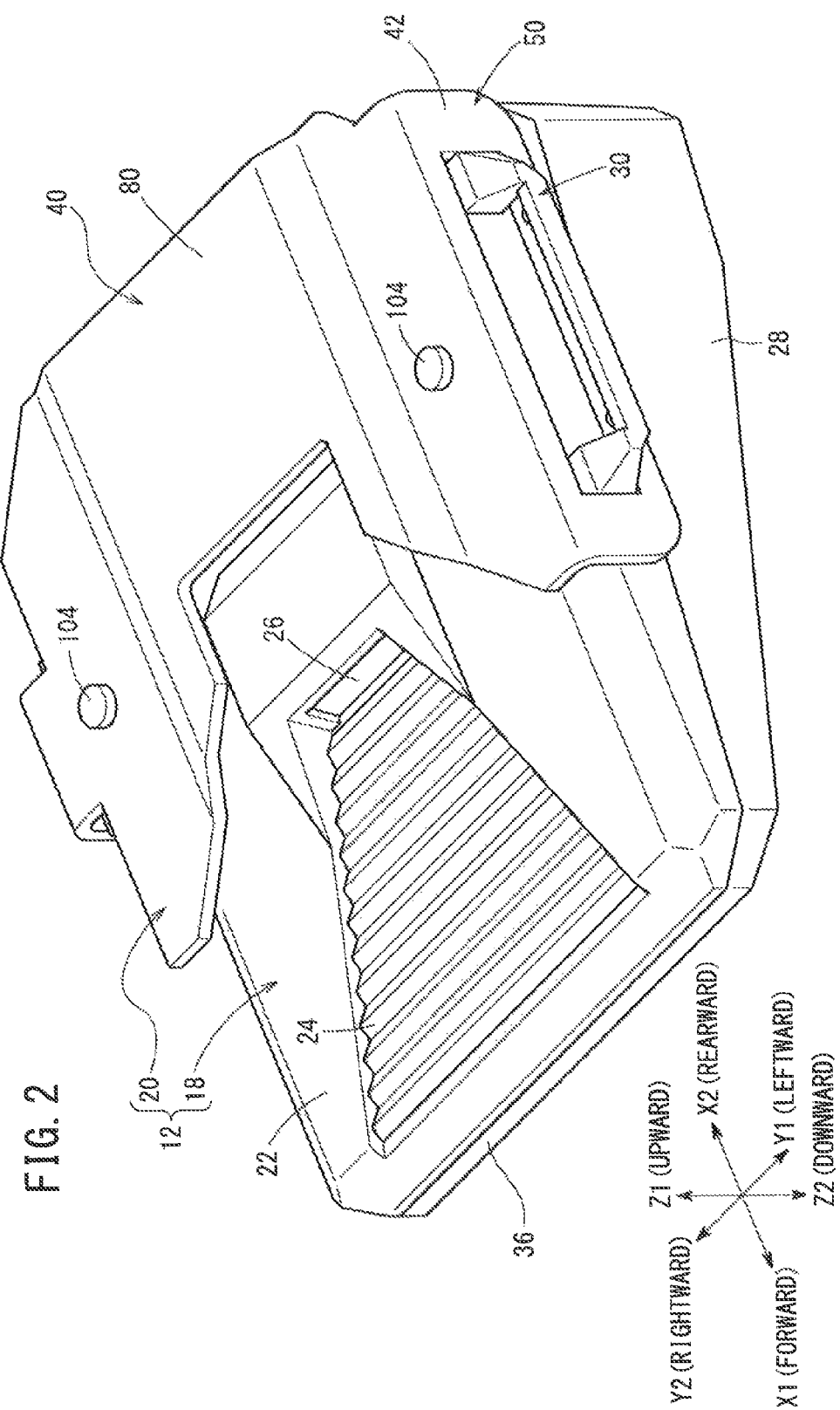
FIG. 2 is a perspective view of the camera unit as viewed from a front-left-side-elevational-plan direction (X2-Y2-Z2 direction)
Figure 3:
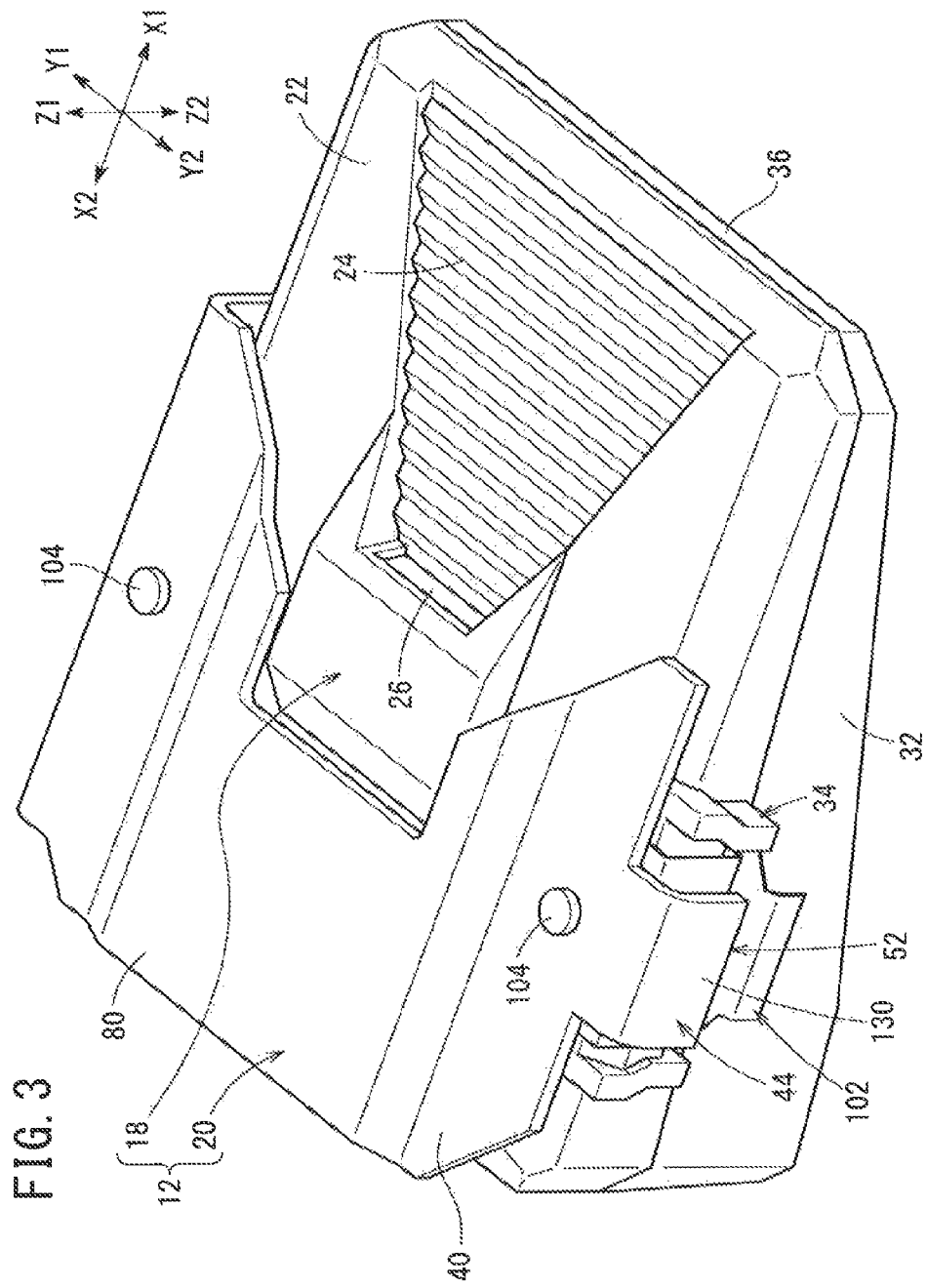
FIG. 3 is a perspective view of the camera unit as viewed from a front-right-side-elevational-plan direction (X2-Y1-Z2 direction)
Figure 4:
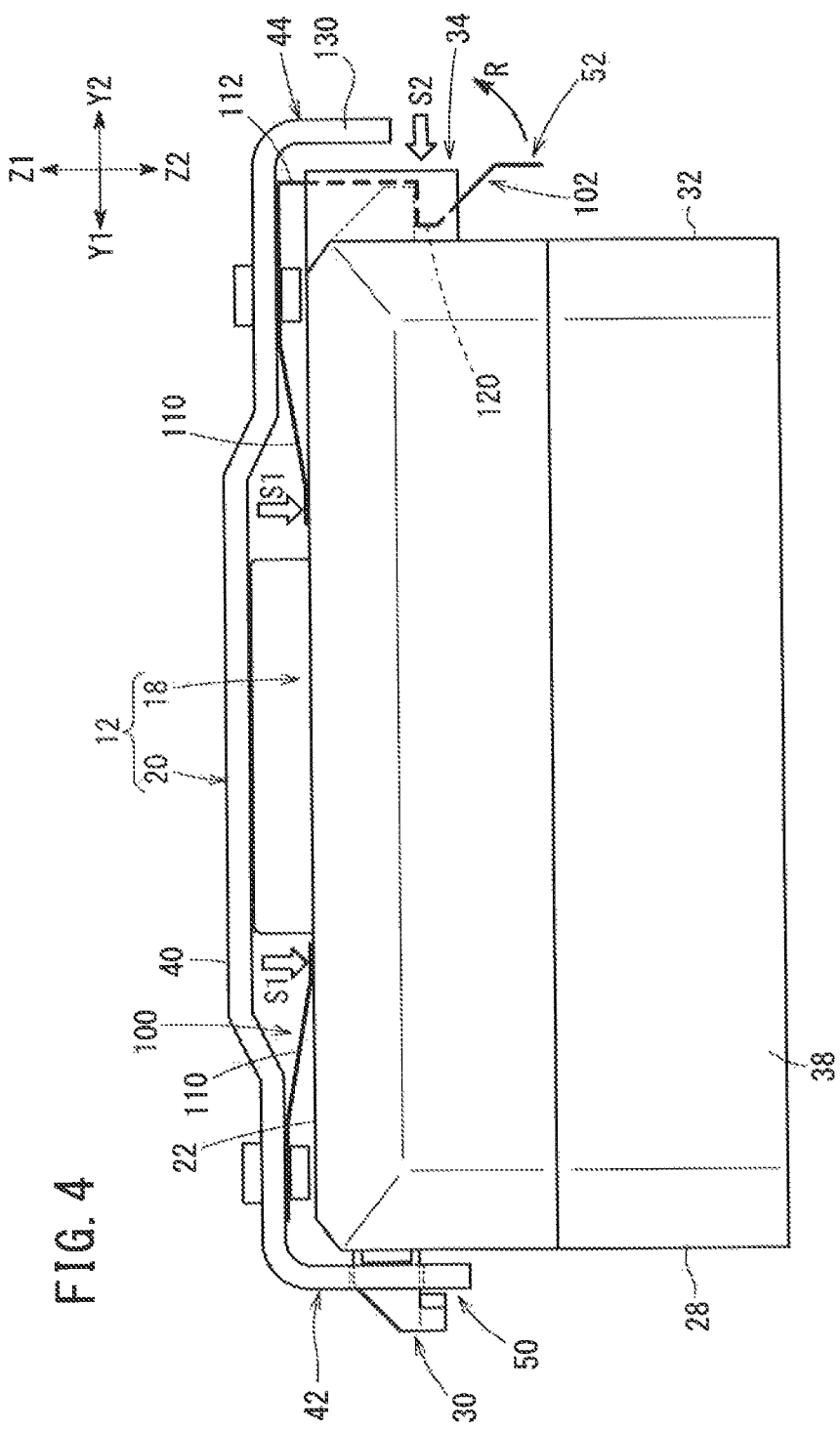
FIG. 4 is a rear elevational view (X1 direction) of the camera unit.
Figure 5:
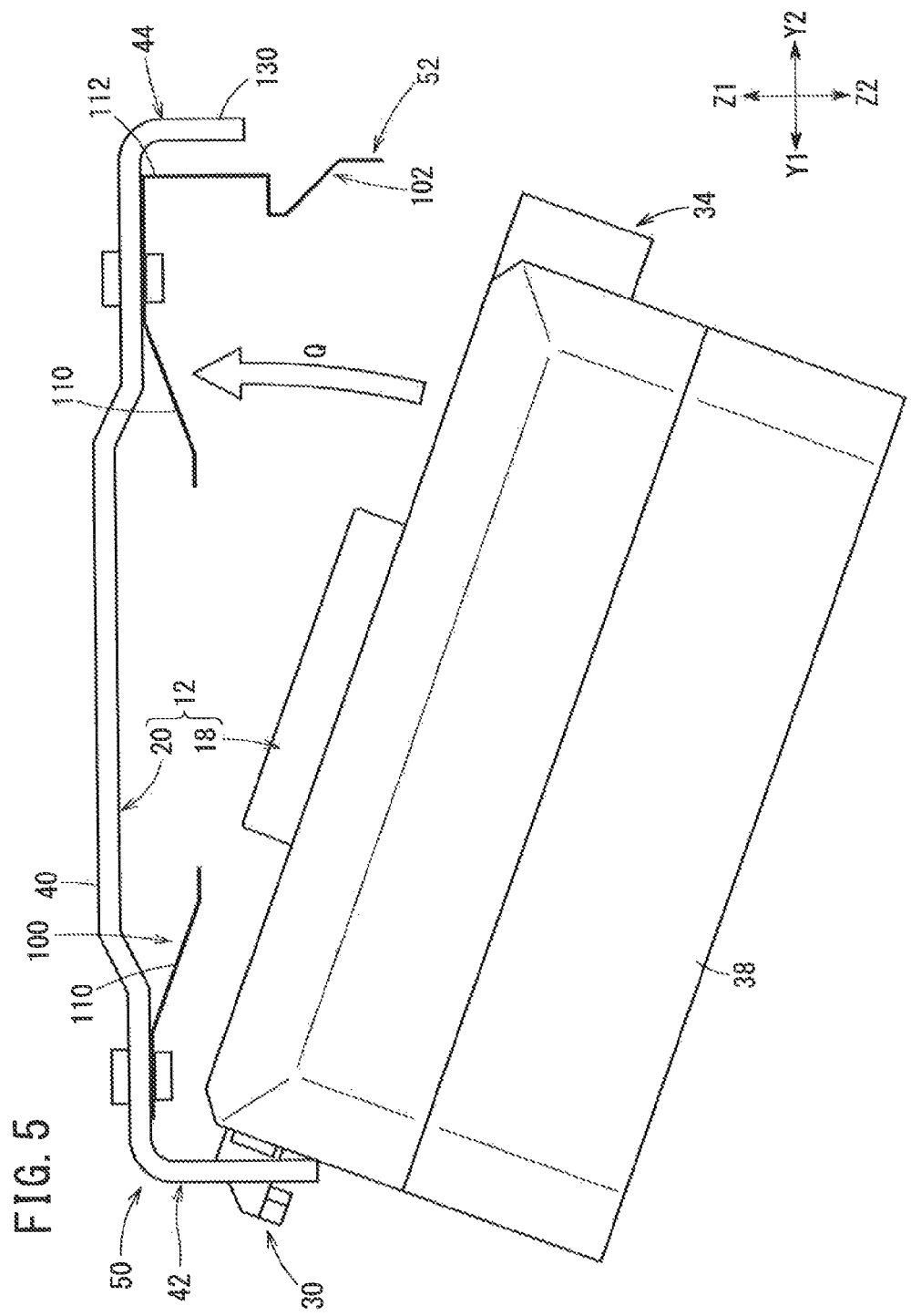
FIG. 5 is a view showing a manner in which a camera body of the camera unit is installed on a bracket.

FIG. 2 is a perspective view of the camera unit 12 as viewed from a front-left-side-elevational-plan direction (X2-Y2-Z2 direction). FIG. 3 is a perspective view of the camera unit 12 as viewed from a front-right-side-elevational-plan direction (X2-Y1-Z2 direction). FIG. 4 is a rear elevational view (X1 direction) of the camera unit 12. FIG. 5 is a view showing a manner in which a camera body 18 of the camera unit 12 is installed on a bracket 20.

As shown in FIGS. 1 through 5, the camera unit 12 includes a camera body 18 (camera case) and a bracket 20. The camera body 18 is detachably supported on the bracket 20, and the bracket 20 secures the camera body 18 to the vehicle 10 (front windshield 14).

Figure 6:
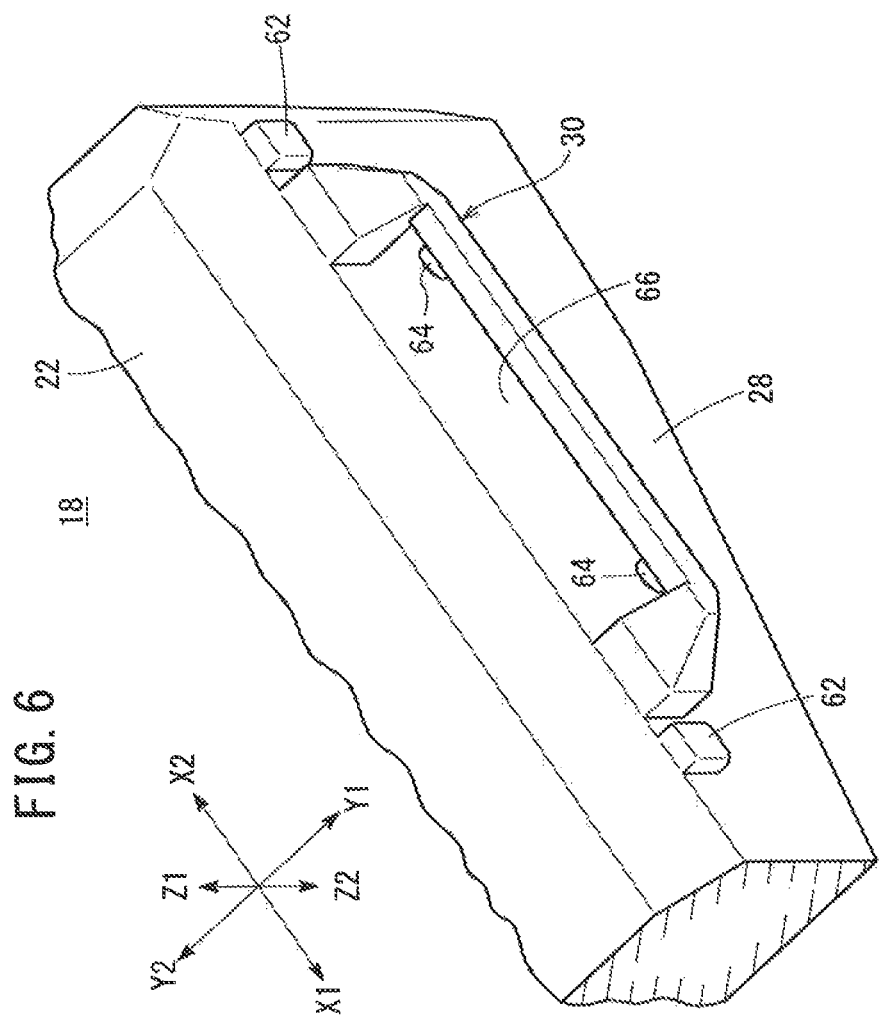
FIG. 6 is an enlarged fragmentary perspective view of the camera body as viewed from the front-left-side-elevational-plan direction (X2-Y2-Z2 direction)
Figure 7:
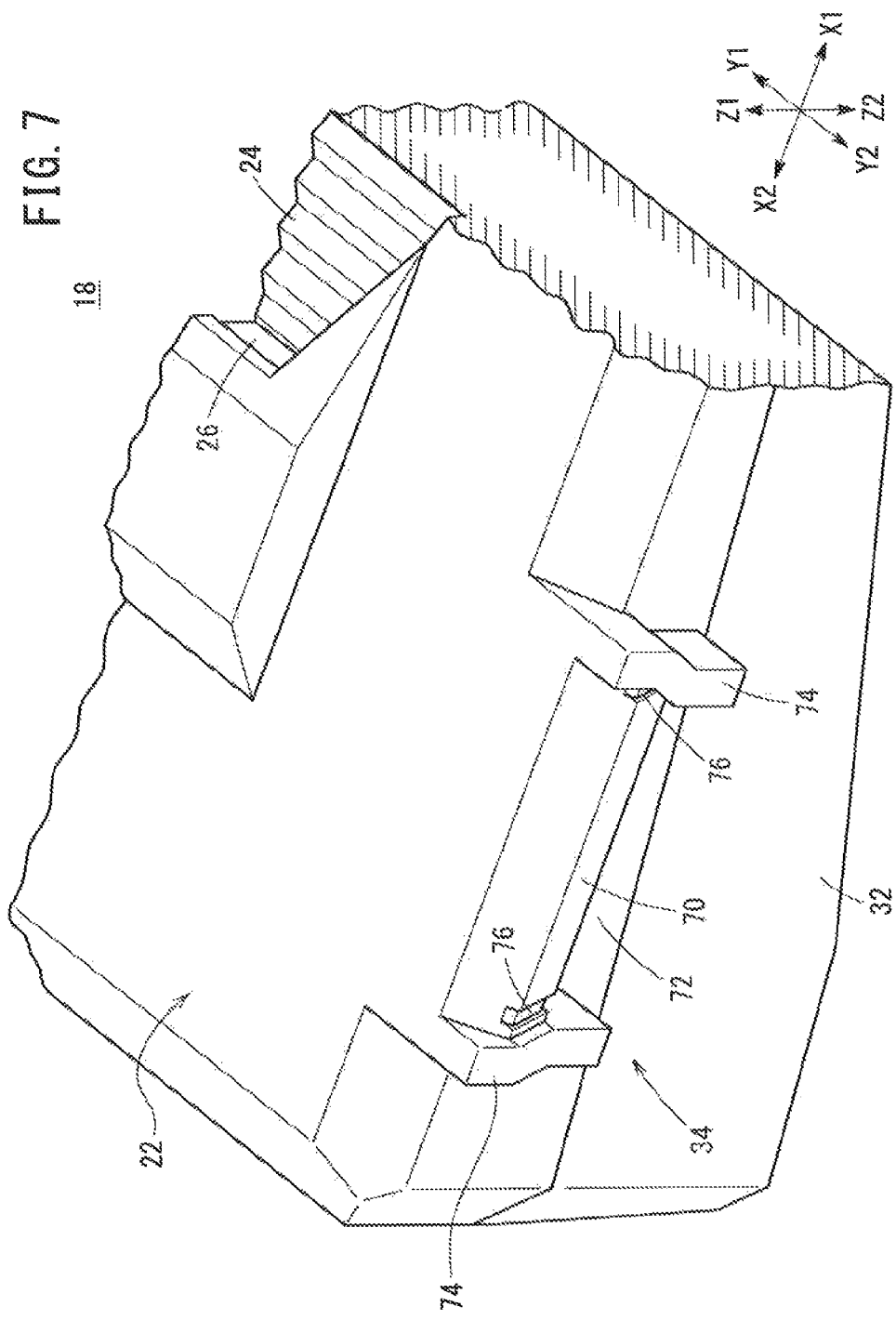
FIG. 7 is an enlarged fragmentary perspective view of the camera body as viewed from the front-right-side-elevational-plan direction (X2-Y1-Z2 direction)
Figure 8:
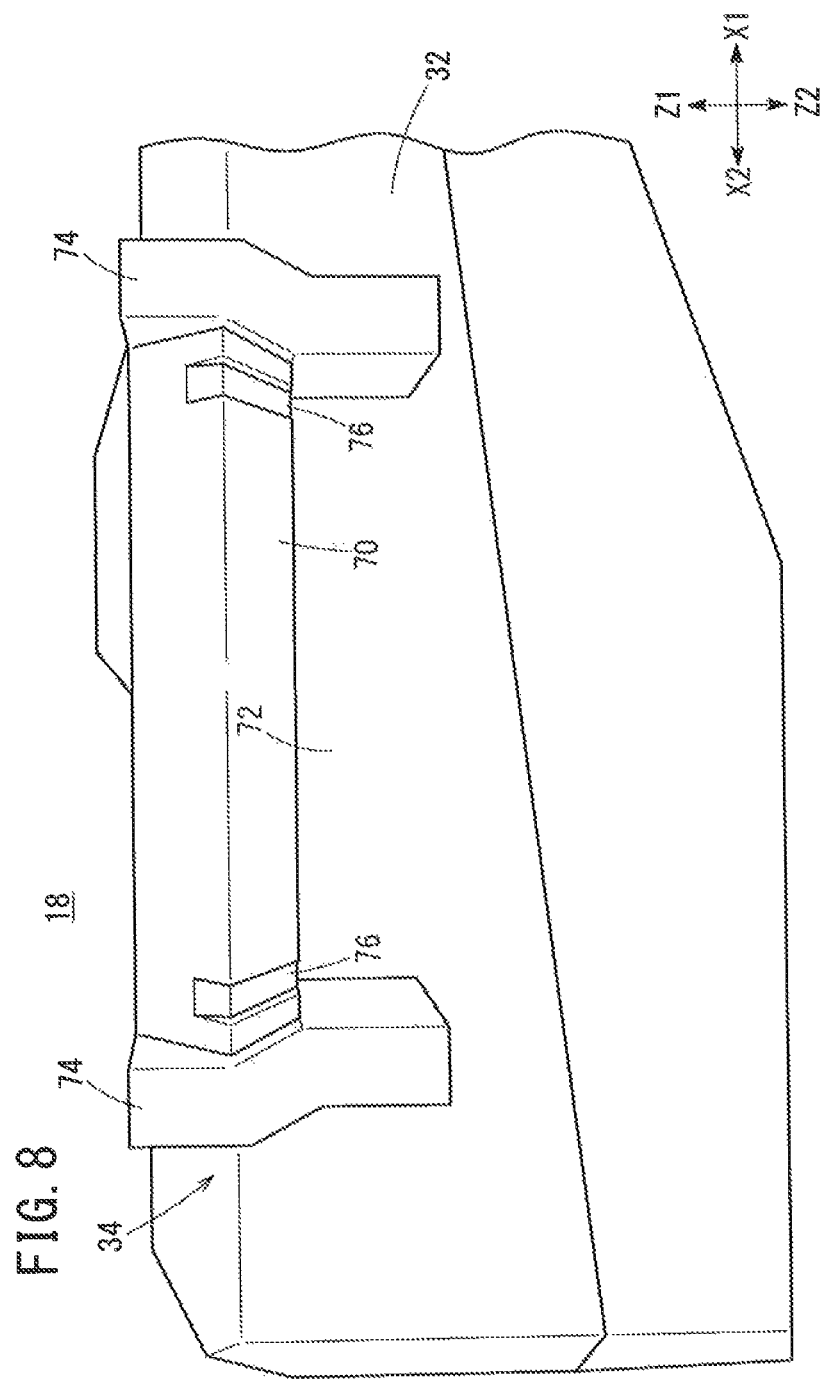
FIG. 8 is an enlarged fragmentary side elevational view of the camera body as viewed from a right side elevational direction (Y1 direction)

FIG. 6 is an enlarged fragmentary perspective view of the camera body 18 as viewed from the front-left-side-elevational-plan direction (X2-Y2-Z2 direction). FIG. 7 is an enlarged fragmentary perspective view of the camera body 18 as viewed from the front-right-side-elevational-plan direction (X2-Y1-Z2 direction). FIG. 8 is an enlarged fragmentary side elevational view of the camera body 18 as viewed from a right side elevational direction (Y1 direction).

The camera body 18 is basically in the form of a rectangular parallelepiped, which is progressively thinner in a forward direction (the X1 direction in FIGS. 1, 2, etc.), as shown in FIG. 1. The camera body 18 has an upper wall 22 with a recess 24 defined therein, and a camera lens 26 disposed in the recess 24. The camera body 18 has a left side wall 28 with a first mounting member 30 disposed thereon, and a right side wall 32 with a second mounting member 34 disposed thereon.

Figure 9:
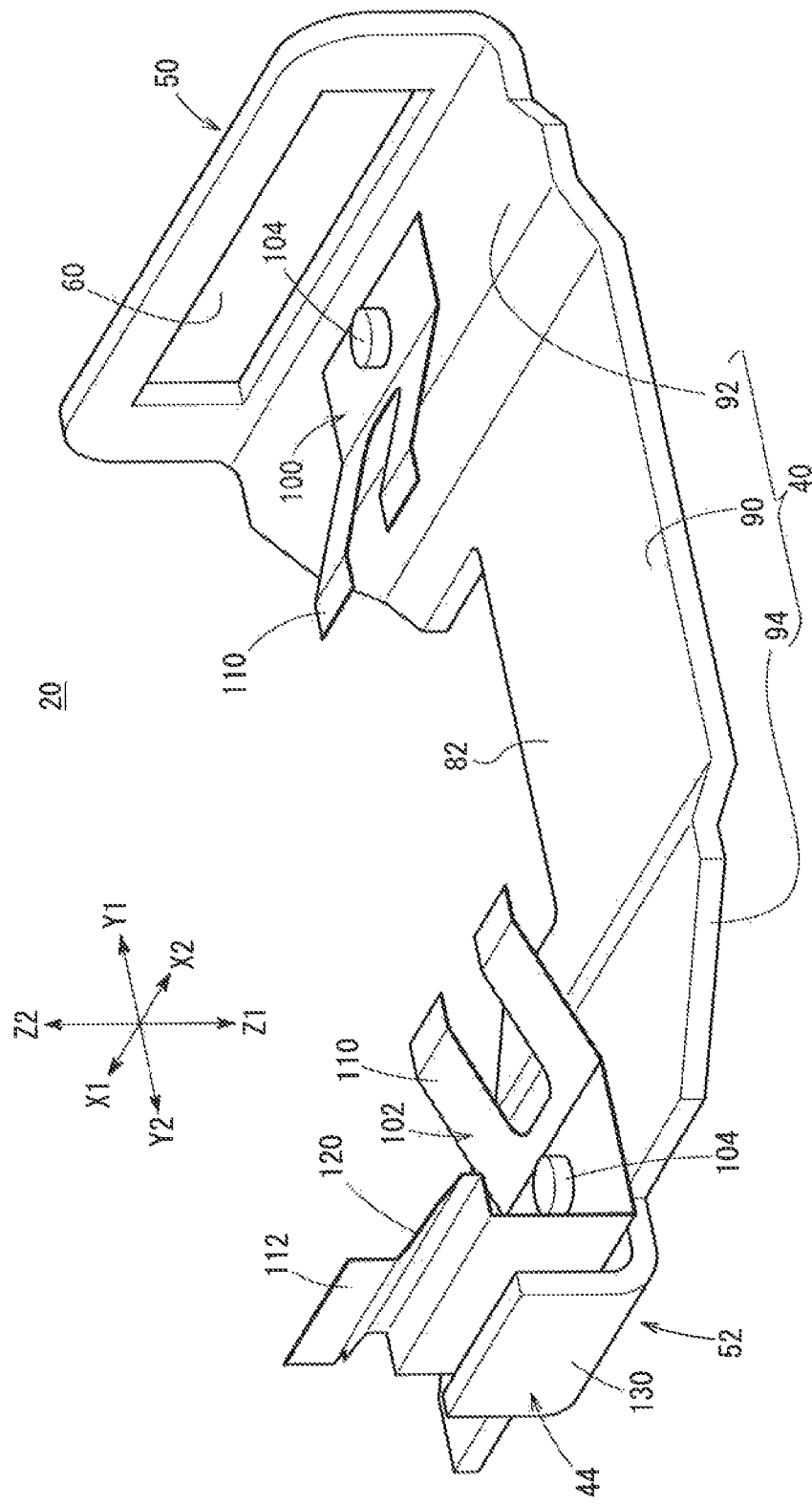
FIG. 9 is a perspective view of the bracket as viewed from a rear-right-side-elevational-bottom direction (X1-Y1-Z1 direction)

FIG. 9 is a perspective view of the bracket 20 as viewed from a rear-right-side-elevational-bottom direction (X1-Y1-Z1 direction). As shown in FIGS. 2 through 4 and 9, the bracket 20 includes an upper central base 40 facing in an upward direction (Z1 direction), a left side wall 42 facing in a leftward direction (Y1 direction), and a right side wall 44 facing in a rightward direction (Y2 direction). The left side wall 42 has a first support flange 50, and the right side wall 44 has a second support flange 52.

As shown in FIGS. 2 through 5, the camera body 18 is inserted into the bracket 20, such that the first and second mounting members 30, 34 of the camera body 18 are supported respectively by the first and second support flanges 50, 52 of the bracket 20, whereupon the camera body 18 is secured to the bracket 20.

[1-3. Camera Body 18]

(1-3-1. Overall Structure)

As described above, the camera body 18 basically is in the form of a rectangular parallelepiped (see FIG. 1, etc.), which is progressively thinner in the forward direction (X1 direction), and the camera lens 26 is disposed in the recess 24 defined in the upper wall 22. The first mounting member 30 is disposed on the left side wall 28 of the camera body 18, whereas the second mounting member 34 is disposed on the right side wall 32 of the camera body 18.

(1-3-2. Camera Lens 26 and Recess 24)

The camera lens 26 is disposed in the recess 24, which basically is in the shape of a triangular pyramid and is defined in the upper wall 22 of the camera body 18. The recess 24 is shaped to provide a field of view for the camera body 18. In this manner, it is possible to impart mechanical strength to the camera body 18 while providing a suitable field of view for the camera body 18.

(1-3-3. First Mounting Member 30)

FIG. 6 shows at an enlarged scale the first mounting member 30 and components in the vicinity thereof. The first mounting member 30 is swingably supported on the first support flange 50 of the bracket 20 (see FIG. 5). As shown in FIG. 4, the first mounting member 30 is hook-shaped as viewed in front and rear elevation. Therefore, the first mounting member 30 will also be referred to as a "hook 30". The hook 30 is inserted into a hole 60, to be described below, which is defined in the first support flange 50 of the bracket 20.

As shown in FIG. 6, the first mounting member 30 has a hole 66 defined therein, which extends in a longitudinal direction (the direction of arrows X1 and X2).

As shown in FIG. 6, two convexities 62 (hereinafter referred to as "positioning convexities 62") are disposed on the left side wall 28 of the camera body 18. The positioning convexities 62 project outwardly (in the Y1 direction) on opposite sides of the first mounting member 30. The function of the positioning convexities 62 will be described later with reference to FIG. 10.

In addition, as shown in FIG. 6, two bosses 64 (hereinafter referred to as "inner bosses 64") are disposed in the hole 66 defined in the first mounting member 30. The inner bosses 64 project toward the left side wall 28 of the camera body 18 from a tip end portion of the first mounting member 30. The function of the inner bosses 64 will be described later with reference to FIG. 10.

(1-3-4. Second Mounting Member 34)

FIGS. 7 and 8 show at an enlarged scale the second mounting member 34 and components in the vicinity thereof. The second mounting member 34 is secured to the second support flange 52 of the bracket 20. As shown in FIGS. 7 and 8, the second mounting member 34 has an engaging ridge 70, an engaging cavity 72, and two side teeth 74.

The engaging ridge 70 projects outwardly (in the Y2 direction) along a downward direction (Z2 direction). The engaging cavity 72 is defined below the engaging ridge 70.

The engaging ridge 70 and the engaging cavity 72 engage a leaf spring 102, to be described later, on the bracket 20, thereby securing the camera body 18 to the bracket 20, as will be described in detail later in connection with the leaf spring 102.

As shown in FIG. 8, the engaging ridge 70 has two grooves 76 defined in respective opposite ends thereof. During movement of the leaf spring 102 from a pressing position to a spaced position, the grooves 76 are effective to prevent the engaging ridge 70 from being scraped due to contact with the leaf spring 102.

The side teeth 74 are disposed respectively on both sides of the engaging ridge 70, thereby preventing the leaf spring 102 from becoming positionally displaced. As shown in FIG. 8, the side teeth 74 have upper portions, which are wider than lower portions of the side teeth, thereby enabling the leaf spring 102 to be positioned easily.

[1-4. Bracket 20]

As described above, the bracket 20 includes the upper central base 40, the left side wall 42 that projects from the left end of the central base 40, and the right side wall 44 that projects from the right end of the central base 40. The bracket 20 is made of a metal such as iron or the like, which is pressed to shape. The central base 40 has an outer surface 80, which is used as a mounting surface and is mounted on the vehicle 10 (front windshield 14) (see FIG. 1). The central base 40 has an inner surface 82 that serves as an accommodating surface arranged in proximity to the upper wall 22 of the camera body 18.

(1-4-1. Central Base 40)

As shown in FIG. 9, the central base 40 includes a central wall 90 positioned centrally in a lateral direction (the direction of arrows Y1 and Y2), a left side wall 92 positioned on the left side of the central wall 90, and a right side wall 94 positioned on the right side of the central wall 90. The left side wall 92 and the right side wall 94 have an axial symmetric shape with respect to the central wall 90 that is disposed therebetween. Further, the left side wall 92 and the right side wall 94 are longer than the central wall 90 in the longitudinal direction (the direction of arrows X1 and X2), particularly in the forward direction. This is because the central wall 90 is formed with a shorter length in order to provide a suitable field of view for the camera body 18.

As shown in FIG. 9, leaf springs 100, 102 are fixed respectively by rivets 104 to the left side wall 92 and the right side wall 94. The leaf springs 100, 102 have respective downward biasing arms 110. The leaf spring 102 also has a lateral biasing arm 112.

As shown in FIG. 9, the downward biasing arm 110 of the leaf spring 100 projects from the left and toward the center in the Y2 direction, and projects downwardly in the Z2 direction. The downward biasing arm 110 of the leaf spring 102 projects from the right and toward the center in the Y1 direction. The downward biasing arm 110 also projects downwardly in the Z2 direction. As indicated by the arrows S1 in FIG. 4, each of the downward biasing arms 110 biases the upper wall 22 of the camera body 18 downwardly in the Z2 direction. Therefore, the camera body 18 is secured firmly in a vertical direction to the bracket 20, and is prevented from being positioned unevenly with respect to the bracket 20.

As shown in FIG. 9, the lateral biasing arm 112 extends downwardly in the Z2 direction, with the principal surface thereof facing toward the camera body 18 in a region outside of the downward biasing arms 110 along the Y2 direction. In this manner, the lateral biasing arm 112 is held against the right side wall 32 of the camera body 18, so as to bias the camera body 18 laterally in the Y1 direction.

As shown in FIG. 9, the lateral biasing arm 112 includes an engaging ledge 120 that projects inwardly in the Y1 direction. The engaging ledge 120 engages with the engaging cavity 72 (FIGS. 7 and 8) of the camera body 18. The position of the leaf spring 102, by which the engaging ledge 120 engages with the engaging cavity 72 and secures the camera body 18 to the bracket 20, will hereinafter be referred to as a "pressing position".

When the leaf spring 102 is in the pressing position, a portion of the leaf spring 102, which is closer to the proximal portion than the engaging ledge 120, is held in contact with the engaging ridge 70 of the camera body 18, thereby exerting a leftward pressing force S2 in the Y1 direction in FIG. 4, and firmly securing the camera body 18 laterally to the bracket 20. Such a feature also prevents the camera body 18 from being positioned unevenly with respect to the bracket 20. Since the camera body 18 is positioned as a result of being pressed by the leaf spring 102, the camera body 18 is subjected to reduced vibration while the vehicle 10 is being driven, and hence noise due to such vibration is reduced.

For removing the camera body 18 from the bracket 20, the operator grips the distal end of the leaf spring 102 with his or her fingers and moves the distal end of the leaf spring 102 in a direction away from the camera body 18, i.e., in the R direction shown in FIG. 4. Accordingly, the second support flange 52 releases the second mounting member 34, thereby allowing the camera body 18 to be turned about the first mounting member 30. Thereafter, the operator removes the first mounting member 30 from the first support flange 50, and removes the camera body 18 from the bracket 20. The position of the leaf spring 102 at the time that the camera body 18 is removed from the bracket 20 will hereinafter be referred to as a "spaced position".

(1-4-2. Stop 130)

As shown in FIGS. 3, 4, and 9, a stop 130 is disposed outwardly of the lateral biasing arm 112 of the leaf spring 102 in the Y2 direction. The stop 130 prevents the lateral biasing arm 112 of the leaf spring 102 from becoming spaced from the camera body 18 farther than the position (spaced position) required to remove the camera body 18. Thus, the stop 130 prevents the leaf spring 102 from becoming plastically deformed. Further, as shown in FIGS. 3, 4, and 9, the stop 130 is formed as part of the bracket 20, and extends from the end of the right side wall 94 downwardly in the Z2 direction. However, rather than being formed as part of the bracket 20, the stop 130 may be provided as a separate member apart from the bracket 20.

2. Installation Process

[2-1. Overall Sequence]

A process of installing the camera body 18 on the bracket 20 will be described below.

Figure 10:
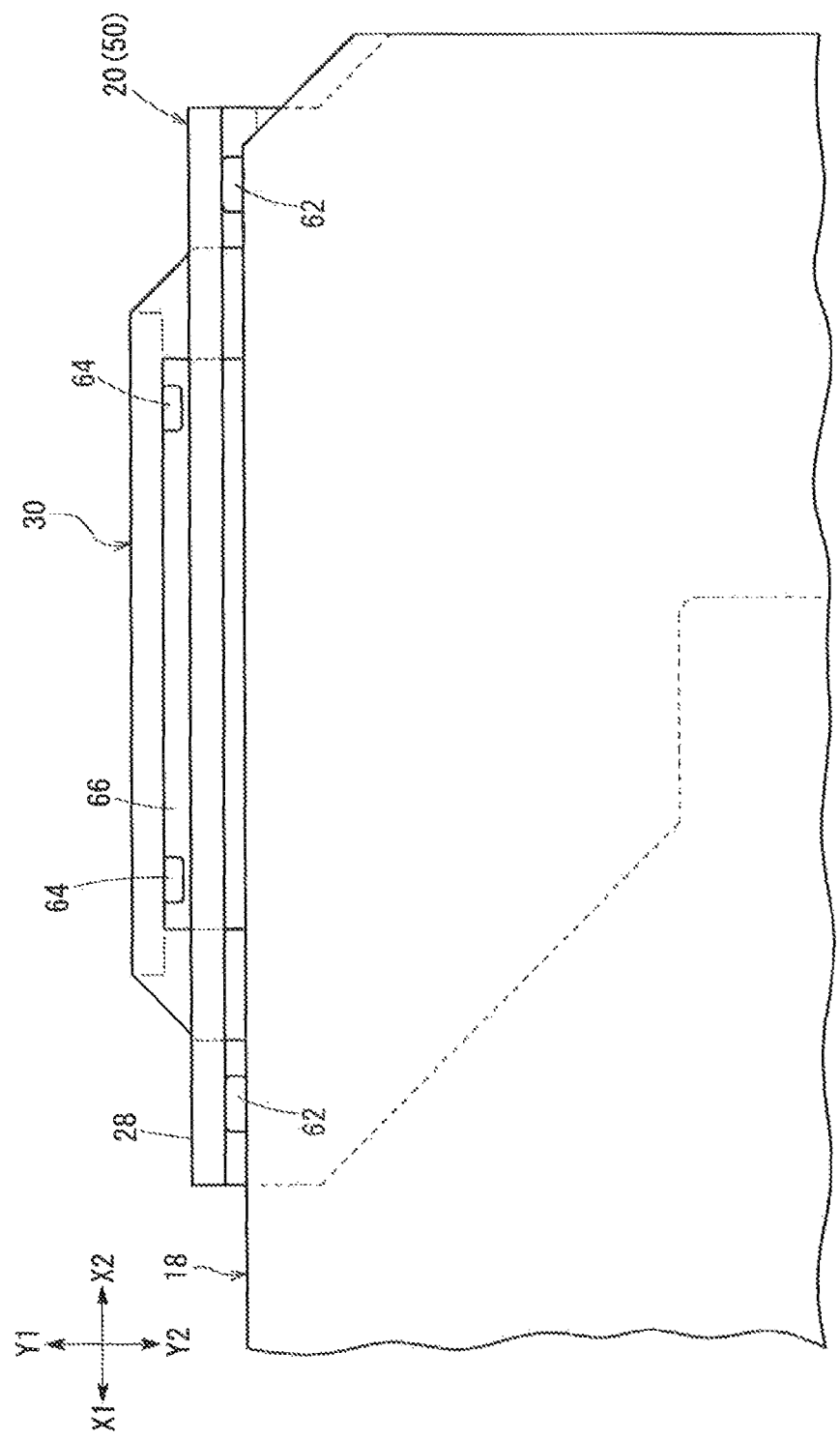
FIG. 10 is an enlarged fragmentary bottom view of the camera unit as viewed from a bottom direction (Z1 direction).

FIG. 10 is an enlarged fragmentary bottom view of the camera unit 12 as viewed from a bottom direction (Z1 direction). In preparation for installing the camera body 18 on the bracket 20, the bracket 20 is fixed in advance to an object (i.e., the front windshield 14) on which the camera unit 12 is to be mounted.

As shown in FIG. 5, the operator inserts the hook 30 of the camera body 18 into the hole 60 of the bracket 20. Next, the operator turns the camera body 18 so that the left and right ends thereof lie at the same height (refer to the arrow Q in FIG. 5). At this time, using his or her fingers, the operator moves the lateral biasing arm 112 of the leaf spring 102 of the bracket 20 outwardly in the R direction. Alternatively, the operator may move the lateral biasing arm 112 outwardly under a force with which the operator presses the camera body 18.

Thereafter, when the engaging ledge 120 of the leaf spring 102 engages with the engaging cavity 72 of the camera body 18, the leaf spring 102 exerts a pressing force S2 (see FIG. 4) against the camera body 18 laterally in the Y1 direction. Accordingly, the camera body 18 is positioned and secured to the bracket 20.

As described above, the camera body 18 includes the positioning convexities 62 (see FIGS. 6 and 10). Therefore, the camera body 18, which is biased by the leaf spring 102, is positioned by the positioning convexities 62. Accordingly, positioning of the optical axis of the camera body 18, which extends in the X1 direction, can be performed reliably.

[2-2. Manner of Use of Inner Bosses 64]

As described above, when the camera body 18 is secured to the bracket 20, the hook 30 of the camera body 18 is inserted into the hole 60 of the bracket 20. The inner bosses 64, which are formed in the hole 66 of the hook 30, project toward the left side wall 28 of the camera body 18 from the tip end portion of the first mounting member 30. Therefore, when the hook 30 is inserted into the hole 60, a portion of the first mounting member 30 around the hole 60 is restricted in position by the inner bosses 64.

Consequently, when the hook 30 is inserted into the hole 60, the inner bosses 64 serve to position the camera body 18. Thereafter, the operator can turn the camera body 18 while the positional relationship between the camera body 18 and the bracket 20 is limited by the inner bosses 64. Accordingly, the camera body 18 can be assembled with fewer assembly irregularities.

3. Advantages of the Present Embodiment

According to the present embodiment, as described above, after the camera body 18 has been turned and positioned with the hook 30 of the camera body 18 held in hooked engagement with the first support flange 50 of the bracket 20 (see FIG. 5), the camera body 18 is secured to the bracket 20 by the second support flange 52 of the bracket 20. Therefore, the camera body 18 can be secured in position without requiring sliding movement of the camera body 18. Hence, the camera unit 12 can be designed with an increased degree of freedom, or can be constructed so as to save space.

In addition, the camera unit 12 can be designed in such a manner that the distance between facing surfaces of the bracket 20 and the camera body 18, i.e., the distance between the inner surface 82 (FIG. 9) of the central base 40 of the bracket 20 and the upper wall 22 of the camera body 18, is reduced when the camera body 18 is turned and positioned with the hook 30 being held in hooked engagement with the first support flange 50. Therefore, the camera unit 12 can be constructed so as to save space.

According to the present embodiment, the first support flange 50 of the bracket 20 is disposed at one end (i.e., the left end) of the left and right ends of the camera body 18, whereas the second support flange 52 of the bracket 20 is disposed at the other end (i.e., the right end) of the left and right ends of the camera body 18 (see FIG. 4). Therefore, the structural details of the camera body 18 are simpler in the longitudinal direction, and further, the image capturing range of the camera body 18 is less subject to limitations than if the first support flange 50 were disposed on one end (e.g., the front end) of the front and rear ends of the camera body 18, and the second support flange 52 were disposed on the other end (e.g., the rear end) of the front and rear ends of the camera body 18.

According to the present embodiment, the second support flange 52 of the bracket 20 has the leaf spring 102 having a principal surface that faces toward the camera body 18. The one end of the leaf spring 102 is fixed to the bracket 20 (bracket body), whereas the other end of the leaf spring 102 is switchable between the pressing position in which the other end presses the camera body 18, and the spaced position in which the other end is spaced from the camera body 18 for enabling removal of the camera body 18 (see FIGS. 4 and 9).

Consequently, after the camera body 18 has been turned and positioned with the hook 30 of the camera body 18 being held in hooked engagement with the first support flange 50 of the bracket 20, the camera body 18 can easily be secured to the bracket 20 by the leaf spring 102.

According to the present embodiment, the bracket 20 has the stop 130 (FIG. 4) for preventing the leaf spring 102 in the spaced position from being spaced farther from the camera body 18, thereby preventing the leaf spring 102 from becoming plastically deformed. Thus, it is possible to prevent the leaf spring 102 from becoming plastically deformed.

According to the present embodiment, the leaf spring 102 of the bracket 20 has the engaging ledge 120 (FIG. 9) that projects toward the camera body 18, and the camera body 18 has the engaging cavity 72 (FIG. 8) for receiving the engaging ledge 120, which engages with the engaging cavity 72 when the leaf spring 102 is in the pressing position. Consequently, when the engaging ledge 120 of the leaf spring 102 engages with the engaging cavity 72 of the camera body 18, the camera body 18 can be secured more reliably to the bracket 20.

According to the present embodiment, the camera body 18 has the grooves 76 (FIG. 8), which are defined therein at positions aligned with or along the side edges of the leaf spring 102, the grooves 76 being arranged more closely to the proximal end (the engaging ledge 70) of the leaf spring 102 than the engaging cavity 72. During movement of the leaf spring 102 from the pressing position to the spaced position, the grooves 76 are effective to prevent a portion of the camera body 18 (the engaging ridge 70) from being scraped due to contact with the leaf spring 102.

According to the present embodiment, the bracket 20 includes the central base 40 (base), which comprises the outer surface 80 (mounting surface) that is placed in contact with the front windshield 14 as an object on which the camera unit 12 is installed, and the left side wall 42 (first side wall) and the right side wall 44 (second side wall), which extend from the central base 40 to the left and right side surfaces of the camera body 18 and are aligned in position with the left and right side surfaces of the camera body 18 (see FIG. 9). The first support flange 50 serves as the left side wall 42, whereas the second support flange 52 serves as the right side wall 44 of the bracket 20. The leaf spring 102 of the second support flange 52 is disposed on the right side wall 44. The positioning convexities 62 (FIGS. 6 and 10), which position the left side wall 42 of the bracket 20, are disposed on the left side wall 28 of the camera body 18 (the side wall facing toward the left side wall 42 of the bracket 20).

The camera body 18, which is biased by the leaf spring 102 disposed on the right side wall 44 (second side wall) of the bracket 20, is positioned by the positioning convexities 62 on the left side wall 42 (first side wall) of the bracket 20. Therefore, the optical axis of the camera body 18 can be positioned reliably. Since the camera body 18 is positioned as a result of being pressed by the leaf spring 102, the camera body 18 is subjected to reduced vibration while the vehicle 10 is being driven, and hence noise due to such vibration is reduced.

According to the present embodiment, the left side wall 42 (first side wall) of the bracket 20 has the hole 60 defined therein (FIG. 9), which receives the hook 30 of the camera body 18 that is inserted into the hole 60. Further, the hook 30 includes the inner bosses 64 (FIGS. 6 and 10) on the tip end portion thereof, which project toward the proximal end of the hook 30. When the hook 30 is inserted into the hole 60, the inner bosses 64 position the camera body 18, such that thereafter, the camera body 18 can be turned while the positional relationship between the camera body 18 and the bracket 20 is limited by the inner bosses 64. Accordingly, the camera body 18 can be assembled with reduced assembly irregularities.

B. Modifications

The present invention is not limited to the above embodiment, but may employ various arrangements based on the disclosure of the present specification. For example, the present invention may employ the following alternative arrangements.

1. Objects to which the Present Invention is Applied

In the above embodiment, the camera unit 12 is applied to a vehicle 10. However, the camera unit 12 may also be applied to other objects, insofar as the camera body 18 is capable of being installed thereon. For example, the present invention may be applied to manufacturing apparatus that make use of a camera as an image sensor for judging defects, measuring dimensions, etc. Furthermore, the present invention may be applied to equipment and systems such as a monitoring camera system for confirming affairs, preventing crime, etc.

The present invention is not limited to the camera unit 12, but may be applied to other devices, which can be installed detachably on the bracket 20 while taking into account the degree of freedom with which such devices can be designed.

2. Camera Body

According to the above embodiment, the camera body 18 is basically in the form of a rectangular parallelepiped, which is progressively thinner in the forward direction (X1 direction). However, the camera body 18 is not limited to such a configuration, insofar as the camera body 18 includes the first mounting member 30, the second mounting member 34, the first support flange 50, and the second support flange 52. For example, the camera body 18 may basically be in the form of a rectangular parallelepiped, the thickness of which remains unchanged in the longitudinal direction (the direction of arrows X1 and X2).

3. Bracket 20

According to the above embodiment, the bracket 20 is fixed by an adhesive to the front windshield 14. However, the bracket 20 may be fixed by way of another means to the object on which the camera unit 12 is installed. For example, the bracket 20 may be fixed by bolts to the roof 16 of the vehicle 10.

According to the above embodiment, the bracket 20 supports the camera body 18 through the upper wall 22, the left side wall 28, and the right side wall 32 thereof. However, the bracket 20 may support the camera body 18 in a different posture, which can be changed depending on the application and manner of use of the camera body 18. For example, the bracket 20 may support the camera body 18 through the upper wall 22, a front wall 36, and a rear wall 38. Alternatively, the bracket 20 may be positioned beneath the camera body 18.

4. First Mounting Member 30, Second Mounting Member 34, First Support Flange 50, and Second Support Flange 52

[4-1. Common Features]

According to the above embodiment, the first mounting member 30 and the first support flange 50 are disposed on the left side (facing in the Y1 direction), and the second mounting member 34 and the second support flange 52 are disposed on the right side (facing in the Y2 direction). However, the left and right sides may be switched. Alternatively, the first mounting member 30 and the first support flange 50 may be disposed on the front side (facing in the X1 direction), and the second mounting member 34 and the second support flange 52 may be disposed on the rear side (facing in the X2 direction).

According to the above embodiment, the first support flange 50 and the second support flange 52 are disposed on left and right ends of the central base 40 (see FIG. 9). For example, from the standpoint of providing the function of the first support flange 50 and the second support flange 52, the first support flange 50 and the second support flange 52 need not necessarily be disposed on the left and right ends of the central base 40, but for example, may be disposed slightly inwardly of the left and right ends of the central base 40.

According to the above embodiment, the camera body 18 has the engaging ridge 70 and the engaging cavity 72, and the leaf spring 102 has the engaging ledge 120. However, insofar as the leaf spring 102 applies a lateral pressing force (biasing force) to the camera body 18, the invention is not limited to the above structural details. For example, the engaging ridge 70 may be dispensed with, and the engaging cavity 72 may be made deeper than the surrounding area. Alternatively, if the pressing force of the leaf spring 102 is relatively strong, then the engaging ridge 70, the engaging cavity 72, and the engaging ledge 120 may be dispensed with.

[4-2. First Mounting Member 30]

According to the above embodiment, the first mounting member 30 includes the positioning convexities 62 and the inner bosses 64 (FIGS. 6 and 10). However, insofar as sufficient attention is paid to the other functions thereof, either one or both of the positioning convexities 62 and the inner bosses 64 may be dispensed with.

[4-3. Second Mounting Member 34]

According to the above embodiment, the engaging ridge 70 includes the side teeth 74 and the grooves 76. However, insofar as sufficient attention is paid to the other functions thereof, either one or both of the side teeth 74 and the grooves 76 may be dispensed with.

[4-4. First Support Flange 50]

According to the above embodiment, the first support flange 50 has the hole 60 (FIG. 9) for receiving the first mounting member 30 (the hook 30), which is inserted in the hole 60. However, insofar as the hook 30 is held in hooked engagement with the first support flange 50 for enabling the camera body 18 to be turned, the invention is not limited to this feature. For example, instead of the hole 60, the first support flange 50 may have another hook for engagement with the hook 30.

[4-5. Second Support Flange 52 (Leaf Spring 102)]

According to the above embodiment, the leaf spring 102 is used for applying the lateral pressing force S2 (see FIG. 4) to the camera body 18, or to enable the second support flange 52 to support or secure the camera body 18. However, other means may be used for applying the lateral pressing force S2 to the camera body 18, or to enable the second support flange 52 to support or secure the camera body 18. For example, rather than the leaf spring 102, a non-illustrated bolt may be inserted or threaded in a lateral direction (Y1 direction) in order to secure the camera body 18 to the bracket 20. Alternatively, such a bolt may be mounted in combination with a non-illustrated helical spring on the bracket 20, and rather than being threaded therein, the bolt may be laterally slidable in the bracket 20 in order to secure the camera body 18 to the bracket 20.

According to the above embodiment, the leaf spring 102 is formed separately from the bracket 20 (bracket body). However, the bracket 20 itself may be formed to function as a leaf spring.

[4-6. Stop 130]

According to the above embodiment, the stop 130 (see FIG. 4) is provided in order to prevent the leaf spring 102 from becoming plastically deformed. However, insofar as the structural details of the first mounting member 30 (hook) and the first support flange 50 are provided, the stop 130 may be dispensed with.

The present invention is not limited to the above embodiments. The embodiments may be changed or modified without departing from the scope of the present invention.

What is claimed is:

1. A camera unit comprising a camera body and a bracket on which the camera body is supported detachably,
the bracket securing the camera body to an object on which the camera unit is installed, wherein:
the camera body includes a hook held in hooked engagement with the bracket; and
the bracket includes:
a first support engaged by the hook and which supports the camera body in an angularly movable fashion;
and a second support supporting the camera body that is secured to the second support
wherein the first support is disposed on one of left and right ends of the camera body; and
the second support is disposed on another of the left and right ends of the camera body;
wherein the second support includes a leaf spring having a principal surface that faces toward the camera body; and
one end of the leaf spring is fixed to a bracket body of the bracket, and another end of the leaf spring is switchable between a pressing position in which the other end normally presses the camera body, and a spaced position in which the other end is spaced from the camera body for enabling removal of the camera body.

2. The camera unit according to claim 1, wherein the bracket has a stop configured to prevent the leaf spring in the spaced position from becoming spaced from the camera body, thereby preventing the leaf spring from becoming plastically deformed.

3. The camera unit according to claim 1, wherein the leaf spring of the bracket has an engaging ledge that projects toward the camera body; and
the camera body has an engaging cavity configured to receive the engaging ledge, which engages in the engaging cavity when the leaf spring is in the pressing position.

4. The camera unit according to claim 3, wherein the camera body has grooves defined therein at positions aligned with side edges of the leaf spring, the grooves being arranged more closely to a proximal end of the leaf spring than the engaging cavity.

5. The camera unit according to claim 1, wherein the bracket further includes:
a base having a mounting surface held in contact with the object; and
a first side wall and a second side wall, which extend from the base and to left and right side surfaces of the camera body, wherein:
the first support is provided as the first side wall;
the second support is provided as the second side wall;
the leaf spring of the second support is disposed on the second side wall; and
a plurality of positioning convexities configured to position the first side wall are disposed on a side surface of the camera body that faces toward the first side wall.

6. The camera unit according to claim 5, wherein the first side wall of the bracket has a hole defined therein for receiving the hook of the camera body that is inserted in the hole; and
an inner boss, which projects toward a proximal end of the hook, is disposed on a tip end portion of the hook.

* * * * *